United States Patent
Schappo et al.

(10) Patent No.: US 10,502,202 B1
(45) Date of Patent: Dec. 10, 2019

(54) COOLING COMPRESSOR COMPRISING PROTECTION ARRANGEMENT FOR ELECTRICAL CONNECTIONS

(71) Applicant: Whirlpool S.A., Sao Paulo (BR)

(72) Inventors: Carlos Alberto Schappo, Joinville (BR); Emerson Moreira, Joinville (BR)

(73) Assignee: Whirlpool, S.A., Sao Paulo (BR)

( * ) Notice: Subject to any disclaimer, the term of this patent is extended or adjusted under 35 U.S.C. 154(b) by 0 days.

(21) Appl. No.: 16/402,390

(22) Filed: May 3, 2019

(30) Foreign Application Priority Data

May 22, 2018 (BR) .......................... 1020180104047

(51) Int. Cl.
| | |
|---|---|
| *G06F 1/16* | (2006.01) |
| *H05K 5/00* | (2006.01) |
| *H05K 7/00* | (2006.01) |
| *F04B 49/10* | (2006.01) |
| *F25B 49/02* | (2006.01) |
| *H02B 1/06* | (2006.01) |
| *F04C 23/00* | (2006.01) |
| *F04C 28/28* | (2006.01) |
| *H01R 13/52* | (2006.01) |
| *F04B 39/12* | (2006.01) |

(52) U.S. Cl.
CPC .............. *F04B 49/10* (2013.01); *F04B 39/12* (2013.01); *F04C 23/008* (2013.01); *F04C 28/28* (2013.01); *F25B 49/02* (2013.01); *H01R 13/52* (2013.01); *H02B 1/06* (2013.01); *F25B 2400/077* (2013.01)

(58) Field of Classification Search
CPC ......... H05K 7/02; F04B 49/065; F04B 49/10; F04B 49/02; F04B 51/00; F04B 39/12; F04C 28/28; F04C 23/008; F25B 49/02

USPC .......... 361/600, 601, 622, 679.01, 831, 752, 361/753, 641, 728, 816, 818, 819, 800; 24/457, 458, 453, 297, 625

See application file for complete search history.

(56) References Cited

U.S. PATENT DOCUMENTS

| | | | | |
|---|---|---|---|---|
| 5,170,307 A | * | 12/1992 | Nacewicz | H01H 61/002 361/24 |
| 5,729,416 A | * | 3/1998 | Renkes | H01H 61/002 310/71 |

(Continued)

FOREIGN PATENT DOCUMENTS

WO WO 2007/077908 A1 7/2007

*Primary Examiner* — Anthony M Haughton
(74) *Attorney, Agent, or Firm* — Harrington & Smith

(57) ABSTRACT

The present invention pertains to the technological field of cooling compressors and, more specifically, relates to an anti-flame protection arrangement for the electrical connections of said cooling compressor. Problem to be solved: Ensure end-user safety of the compressor through a simple and inexpensive solution and preventing the maintenance and/or propagation of flames/fire in the region of the chamber defined by the protective cover of the electrical connections external to the compressor housing. Problem resolution: Accordingly, it is provided a cooling compressor including a protection arrangement for electrical connections integrated by a protective cover defining an electrical connections chamber external to the housing, the protective cover being physically associated with an anti-flame body, which defines a sealing portion, preferably making the electrical connections chamber hermetic in relation to an external environment.

15 Claims, 1 Drawing Sheet

(56) References Cited

U.S. PATENT DOCUMENTS

| | | | |
|---|---|---|---|
| 6,665,196 B2 | 12/2003 | Jang | 361/816 |
| 6,760,216 B2 | 7/2004 | Seo | 361/601 |
| 7,240,508 B2* | 7/2007 | Park | H01H 61/002 62/298 |
| 9,025,286 B2* | 5/2015 | Washburn | H01H 61/002 361/22 |
| 9,480,177 B2 | 10/2016 | Trudeau, Jr. et al. | |
| 9,709,315 B2* | 7/2017 | Son | F25D 23/00 |
| 2003/0012669 A1* | 1/2003 | Kawashima | F04B 39/12 417/423.1 |
| 2011/0008193 A1* | 1/2011 | Park | F04B 39/121 417/417 |
| 2011/0268593 A1* | 11/2011 | Yamada | F04B 35/04 417/410.1 |
| 2012/0327539 A1* | 12/2012 | Washburn | H01H 61/002 361/22 |
| 2013/0209299 A1* | 8/2013 | Santos | F04C 18/356 418/1 |
| 2018/0354344 A1* | 12/2018 | Miura | F25B 49/02 |

* cited by examiner

COOLING COMPRESSOR COMPRISING PROTECTION ARRANGEMENT FOR ELECTRICAL CONNECTIONS

FIELD OF THE INVENTION

The present invention relates to a cooling compressor and, more specifically, to an anti-flame protection arrangement for the electrical connections of said cooling compressor.

FUNDAMENTALS OF THE INVENTION

As is well known to those skilled in the art, cooling compressors are machines responsible for raising the pressure of a working fluid by means of a compression mechanism, so that said working fluid, flowing along a cooling circuit and changing phase along said flow, is capable of absorbing and/or releasing heat from certain environments and/or devices, the so-called heat exchangers, for example.

Many types of compression mechanisms are known in the art, and it is common for such mechanisms to be driven by a crankshaft associated with an electric engine, which is usually energized by an electric source external to the compressor housing.

For said energizing of the electric engine to be effected, it is also common for electro-electronic and/or electro-mechanical arrangements comprising electrical terminals to be arranged in the wall of the compressor housing, so as to be contacted by power supply plugs. It is also known from the state of the art that the set of electrical terminals of the compressor and the power plug, among other possible components, are wrapped by a protective cover, which, therefore, is also disposed externally to the compressor housing.

Different configurations of protective covers for electrical connections arrangements of cooling compressors are described in the state of the art, each with its particularity. In general, said protective covers are intended to prevent impacts and prevent entry of humidity and/or dirt in the interior of the chamber that they define next to the compressor housing (or together with a support of set of electrical terminals), reducing the chances of corrosion and damaging the electrical terminals and/or said other electrical components disposed adjacent thereto.

In particular, it is noted, for example, that WO2007077908 discloses a protection device for arrangements of electrical connections and electrical components, comprising a protective cover, made of plastic material, to house said arrangement of connections and respective electrical components, said protective cover including, among other features, a kind of channel that conducts water which, by chance, deposit itself on said cover, preventing said liquid from coming into contact with the electrical connections and/or components.

Document U.S. Pat. No. 6,760,216 also discloses a cover for the purpose of protecting electrical components disposed on the outer surface of the housing of a compressor. In turn, the focus of such US document is the provision of a solution for rapid assembly and disassembly of said protective cover.

Other solutions are also described in U.S. Pat. Nos. 9,480,177 and 6,665,196, for example.

In any case, and although the solutions described above prove to be functional for the purposes for which they were made feasible, it is noted that there is still a gap in the state of the art with regard to fire prevention and/or flame propagation in the region of the electrical connections enveloped by these protective covers.

In this regard, it is noted that there may be sparks in the electrical contacts internal to said protective cover, sparks which may give rise to small flames fed by the oxygen contained in the chamber defined by the protective cover, which, if not contained, could result in considerable fires.

This is because these small flames, when originated, may end up damaging the electro-electronic circuit board or the electrical terminals themselves with the compressor housing, compromising the tightness of the latter, resulting in a working fluid leakage gap (coolant fluid) from the inside of the compressor housing into the protective cover (external environment to the compressor housing), further increasing the flammability of the combustion mixture.

Since, at least in some countries, environmental regulations allow the use of flammable coolant fluids and, due to the need to increase the quantity of these flammable fluids in a cooling circuit, in view of the demand for greater cooling capacities, among other reasons, it is imperative that a solution be developed that is capable of mitigating such flammability and/or preventing the spread of flames/fires in the region in question, in order to ensure perfect end-user safety of the compressor.

It is from this scenario that the invention in question arises.

Objectives of the Invention

In this manner, it is the fundamental goal of the invention in question to ensure end-user safety of the compressor, through a simple and inexpensive solution.

It is also a goal of the present invention to disclose a solution capable of preventing the maintenance and/or propagation of flames/fire in the region of the chamber defined by the protective cover of the electrical connections external to the compressor housing.

Another goal is to describe a way of mitigating the stoichiometric point of the coolant fluid.

SUMMARY OF THE INVENTION

The goals summarized above are fully achieved by means of a cooling compressor comprising a protection arrangement for electrical connections, said cooling compressor including a housing, a compression mechanism disposed within the housing, an electric engine capable of actuating the compression mechanism, a set of electrical terminals, which is physically associated with a housing wall, a protective cover defining an electrical connections chamber external to the housing, said electrical connections chamber accommodating the set of electrical terminals and power plugs that connect electrically to the set of electrical terminals and energize the electric engine.

Particularly in accordance with the present invention, said protective cover is physically associated with an anti-flame body that defines a sealing portion, rendering the electrical connections chamber hermetic with respect to an external environment. In this manner, it is emphasized that the anti-flame body prevents the entry of oxygen to the interior of the electrical connections chamber and prevents the exit of coolant fluid from said electrical connections chamber, since, preferably, it is a flexible body capable to mold itself to the contour of the parts on which it is mounted.

Said anti-flame body is capable of preventing the exchange of gaseous fluids from the interior of the electrical connections chamber with the external environment.

Preferably, said anti-flame body at least partially covers the protective cover and is disposed adjacent to an outer face of the protective cover, externally to the electrical connections chamber, providing the interface between the protective cover and the housing of the compressor, directly or indirectly.

Alternatively, the anti-flame body is disposed adjacent to an inner face of the protective cover, internally to the electrical connections chamber. According to a second alternative, the anti-flame body is disposed adjacent to the edge of the protective cover.

The anti-flame body is made from a polymer material among the group of: thermoplastic, elastomer, heat shrinkable, the heat shrinkable material being preferred.

Also, in a preferred manner, the anti-flame body is assembled by interference adjacent to the protective cover, but, alternatively, can be overinjected.

The anti-flame body may comprise a ring, glove or cup shape, or even a shape and/or contour analogous to that of the protective cover.

BRIEF DESCRIPTION OF THE DRAWINGS

The invention in question will be described in detail on the basis of the illustrative figures listed below, which.

DETAILED DESCRIPTION OF THE INVENTION

Figure 1:
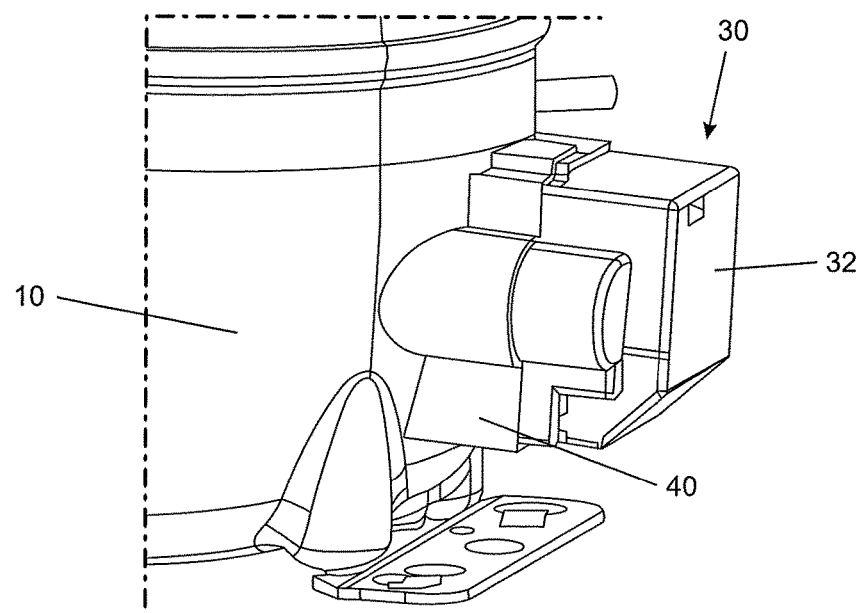
FIG. 1 shows a perspective view of the region of the electrical connections of the cooling compressor, in accordance with the present invention.
Figure 2:
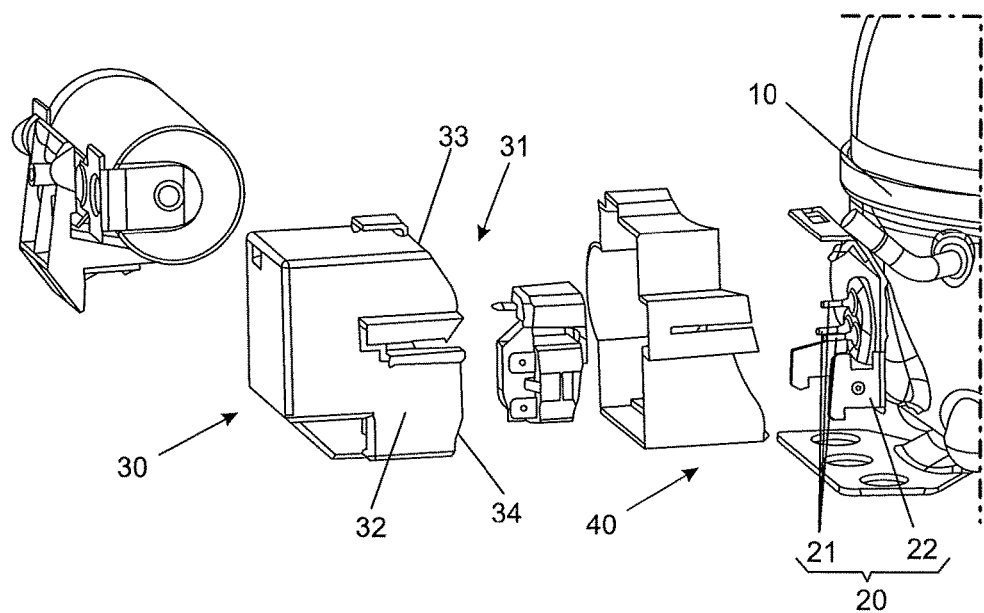
FIG. 2 shows an exploded view of the region of the electrical connections of the cooling compressor, in accordance with the present invention.

According to the central goals of the invention in question, it is disclosed a cooling compressor comprising a housing (10), a compression mechanism disposed within the housing (10), an electric engine capable of actuating the compression mechanism, a set of electrical terminals (20) capable to be connected to power supply plugs that energize the electric engine and, especially, a protection arrangement for electrical connections.

Various arrangements of the set of electrical terminals (20) are possible according to the state of the art, wherein by set of electrical terminals (20) one may understand the connector pins (21) itself, the electro-electronic circuit board, which comprises or is electrically associated with said connector pins (21), the possible plurality of electro-electronic components associated with said elements, the metal support (22) which physically associates all of said components or the combination between only a few of these, etc., so that the detailed description of said assembly and its attachment to the housing (10) of the compressor of the present invention do not need to be described in detail.

What needs to be clarified, however, is that the set of electrical terminals (20) of the present invention is physically associated with the housing wall (10), in a sealed manner, so as to prevent the escape of coolant fluid from the interior of the housing (10) to the exterior, as well as that a protective cover (30) is provided adjacent to the housing (10) so as to surround and accommodate the electrical connections existing in that region external to the housing (10) of the compressor.

Said protective cover (30) may be attached directly to the housing (10) of the compressor or to the metal support (22) previously mentioned, for example, being that such an attachment may occur by simple engagement, screwing, or any other suitable attachment means. Some interrelations between the protective cover (30) and the housing (10) of the compressor are known, so that for the elucidation of the present invention, it is also not necessary to describe them in detail.

Said protective cover (30), when associated with the housing (10) of the compressor, directly or indirectly, as explained above, ends up defining a volume here referred to as the electrical connections chamber (31).

It is pointed out that said electrical connections chamber (31) is external to the housing (10) of the compressor, and that said electrical connections chamber (31) accommodates the set of electrical terminals (20) and power supply plugs which, as already described, electrically connect to the set of electrical terminals (20) and energize the electric engine.

In this manner, the electrical connections between the set of electrical terminals (20) and the power supply plugs, among other possible connections, are substantially protected from impacts and humidity which may damage said connections.

Inevitably, the physical association between protective cover (30) and housing (10) or metal support (22) may define gaps that provide fluid communication between the external environment and the electrical connections chamber (31), a feature which the present invention seeks to eliminate.

Therefore, in particular in accordance with the present invention, said protective cover (30) is physically associated with an anti-flame body (40), which is capable of making, in a preferred manner, but never in a limiting way, the electrical connections chamber (31) hermetic in relation to an external environment, namely, the kitchen environment in which a refrigerator equipped with the present cooling compressor is located, for example.

In other words, said anti-flame body (40) eliminates the fluid communication from the electrical connections chamber (31) to the external environment, since it defines a sealing portion at the interface between the protective cover (30) and the compressor component to which the latter is attached, namely, the housing (10) or the metal support (22), for example.

The anti-flame body (40) is, therefore, especially provided in the protection arrangement for electrical connection of the present invention, ensuring the sealing of the electrical connections chamber (31), preventing the entry of oxygen into that electrical connections chamber (31) and also preventing the outlet of any coolant fluid unduly contained within said electrical connections chamber (31), as is described in detail below.

In this manner, from a first perspective, it is emphasized that even though there is a certain amount of oxygen within the electrical connections chamber (31)—which is unpreventable when assembling said protective cover (30), unless some suction mechanism is used to withdraw the oxygen from this environment—when a spark causes a flame spontaneously in the region of the above-mentioned electrical connections, such a flame would tend to consume the combustion agent (oxygen) and extinguish itself, since the available amount of oxygen for the maintenance of that flame would be extinguished and new portions of oxygen would not be capable to enter the electrical connections chamber (31) due to the provision of the anti-flame body (40).

On the other hand, and in a second perspective, if such spark causes a flame and the amount of oxygen within the electrical connections chamber (31) is such that it is capable to maintain said flame for a period—even if considerably brief—sufficient to deteriorate the seal between the set of electrical terminals (20) with the housing (10), even if an leakage gap of coolant fluid is unduly defined and increases the flammability of the gas mixture in the interior of the electrical connections chamber (31), such leakage does not occur through of the anti-flame body (40) due to the seal provided by it, as well as a larger flame does not propagate for the same reason, and also because, preferably, said anti-flame body (40), as its name already points out, comprises anti-flame properties (or flame retardant).

Said anti-flame body (40) is thin and flexible—being capable to mold itself to the contour of the parts on which it is mounted—and coats the protective cover (30) at least partially, but preferably throughout its area. Further in accordance with the preferred embodiment of the present invention, the anti-flame body (40) is disposed adjacent to an outer face (32) of the protective cover (30), externally to the electrical connections chamber (31). The advantage of this arrangement will be pointed out below.

Alternatively, the anti-flame body (40) is disposed adjacent to an inner face (33) of the protective cover (30) internally to the electrical connections chamber (31). The advantage of such a constructive alternative is the possibility of maintaining the integrity of the protective cover (30) itself, if said internal face (33) is entirely coated by the anti-flame body (40), which may prevent an obvious perception of the defect of the product by the user while maintaining the reliability image of the user.

According to a second alternative, the anti-flame body (40) is disposed adjacent to the edge (34) of the protective cover (30). The problem with this type of configuration is the difficulty of mounting the anti-flame body (40) in the correct position, which could require a quality control more critical and/or impair the tightness of the electrical connections chamber (31).

Further in accordance with the preferred embodiment of the present invention, the anti-flame body (40) is assembled by interference adjacent to the protective cover (30). Alternatively, the anti-flame body (40) is overinjected to the protective cover (30).

In addition, the anti-flame body (40) is made of a thermoplastic, elastomeric and/or heat shrinkable polymer material, wherein, according to the preferred embodiment of the present invention, the polymer material chosen is heat shrinkable, due to the inherent advantages related to that type of material precisely for sealing applications.

In this sense, it should be highlighted that products made from heat shrinkable materials, when subjected to a heat source, retract and have their dimensions reduced and/or their shape changed, being that, after cooling, these new dimensions and format remain. In addition, and when deposited on a second object, after heating and retraction, said heat shrinkable products are capable to adhere strongly to said second object, which is why they are widely used as sealing elements, as mentioned above.

In this manner, according to the preferred features of the anti-flame body (40) assembly, it will be appreciated that a simple polymer body, made of heat shrinkable material, may coat the latter by interference only by positioning this body on and externally to the protective cover (30) and increasing its temperature until said body is molded and secured to the protective cover (30) and/or the protective cover (30) and the housing (10) of the compressor simultaneously and/or to the protective cover (30) and the set of electrical terminals (20) simultaneously.

In this way, it is possible a manufacture that does not require too much assembly precision and/or expensive quality control, and also achieves the objectives of delimiting an airtight and safe environment in the electrical connections chamber (31).

Regardless of the type of assembly and arrangement of said anti-flame body (40) in relation to the protective cover (30), it is pointed out that such anti-flame body (40) may assume a ring, tube, glove, cup shape (i.e., tubular with flanges at one end) or a shape and/or contour analogous to that of the protective cover (30), the latter being mainly feasible in the case of over-injection and/or in the case of the use of heat shrinkable materials.

Thus, in summary, it may be stated that the anti-flame body (40) is capable of preventing the entry of oxygen existing in the external environment to the interior of the electrical connections chamber (31) and, on the other hand, the anti-flame body (40) is capable of preventing the exit of any flames or sparks generated in the interior of the electrical connections chamber (31) to the external environment.

It is important to note that the above description has the sole goal of describing in an exemplary manner the particular embodiment of the invention in question. It is, therefore, clear that modifications, variations and constructive combinations of elements performing the same function in substantially the same manner to achieve the same results, remain within the scope of protection defined by the appended claims.

The invention claimed is:

1. Cooling compressor comprising protection arrangement for electrical connections, said cooling compressor including:
   a housing;
   a compression mechanism disposed within the housing;
   an electric engine capable of actuating the compression mechanism;
   a set of electrical terminals, said set of electrical terminals being physically associated with a wall of the housing;
   a protective cover defining an electrical connections chamber external to the housing, being that said electrical connections chamber accommodate the set of electrical terminals and power supply plugs that connect electrically to the set of electrical terminals and energize the electric engine;
   said cooling compressor characterized by the fact that:
   the protective cover is physically associated with an anti-flame body defining a sealing portion;
   said anti-flame body being capable to prevent the exchange of gaseous fluids from the interior of the electrical connections chamber with the external environment.

2. Cooling compressor comprising protection arrangement for electrical connections, according to claim 1, characterized by the fact that the protective cover is physically associated with an anti-flame body defining a sealing portion, being capable of rendering the electrical connections chamber hermetic in relation to an external environment.

3. Cooling compressor comprising protection arrangement for electrical connections, according to claim 1, characterized by the fact that the anti-flame body prevents the entry of oxygen to the interior of the electrical connections chamber and prevents the outlet of coolant fluid from said electrical connections chamber.

4. Cooling compressor comprising protection arrangement for electrical connections, according to claim 1, characterized by the fact that the anti-flame body is flexible.

5. Cooling compressor comprising protection arrangement for electrical connections, according to claim 1, characterized by the fact that the anti-flame body covers, at least partially, the protective cover.

6. Cooling compressor comprising protection arrangement for electrical connections, according to claim 1, characterized by the fact that the anti-flame body is disposed adjacent to an outer face of the protective cover, externally to the electrical connections chamber.

7. Cooling compressor comprising protection arrangement for electrical connections, according to claim 1, characterized by the fact that the anti-flame body is disposed adjacent to an inner face of the protective cover, internally to the electrical connections chamber.

8. Cooling compressor comprising protection arrangement for electrical connections, according to claim 1, characterized by the fact that the anti-flame body is disposed at the interface between the protective cover and the housing of the compressor, directly or indirectly.

9. Cooling compressor comprising protection arrangement for electrical connections, according to claim 1, characterized by the fact that the anti-flame body is made of a polymer material among the group of: thermoplastic, elastomer, heat shrinkable.

10. Cooling compressor comprising protection arrangement for electrical connections, according to claim 1, characterized by the fact that the anti-flame body is overinjected to the protective cover.

11. Cooling compressor comprising protection arrangement for electrical connections, according to claim 1, characterized by the fact that the anti-flame body is assembled by interference adjacent to the protective cover.

12. Cooling compressor comprising protection arrangement for electrical connections, according to claim 1, characterized by the fact that the anti-flame body comprises a ring, glove or cup shape.

13. Cooling compressor comprising protection arrangement for electrical connections, according to claim 1, characterized by the fact that the anti-flame body comprises a shape and/or contour analogous to that of the protective cover.

14. Cooling compressor comprising protection arrangement for electrical connections, according to claim 1, characterized by the fact that the anti-flame body is capable of preventing the entry of oxygen existing in the external environment to the interior of the electrical connections chamber.

15. Cooling compressor comprising protection arrangement for electrical connections, according to claim 1, characterized by the fact that the anti-flame body is capable of preventing the exit of any flames or sparks generated in the interior of the electrical connections chamber to the external environment.

* * * * *